(12) United States Patent
Wood et al.

(10) Patent No.: US 10,861,165 B2
(45) Date of Patent: Dec. 8, 2020

(54) SUBJECT TRACKING WITH ALIASED TIME-OF-FLIGHT DATA

(71) Applicant: Microsoft Technology Licensing, LLC, Redmond, WA (US)

(72) Inventors: Erroll William Wood, Cambridge (GB); Michael Bleyer, Seattle, WA (US); Christopher Douglas Edmonds, Carnation, WA (US); Michael Scott Fenton, Sunnyvale, CA (US); Mark James Finocchio, Redmond, WA (US); John Albert Judnich, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/299,076

(22) Filed: Mar. 11, 2019

(65) Prior Publication Data
US 2020/0226765 A1    Jul. 16, 2020

Related U.S. Application Data

(60) Provisional application No. 62/791,640, filed on Jan. 11, 2019.

(51) Int. Cl.
*G06T 7/215*    (2017.01)
*H04N 5/235*    (2006.01)
(Continued)

(52) U.S. Cl.
CPC ............ *G06T 7/215* (2017.01); *G06K 9/6257* (2013.01); *G06T 7/194* (2017.01); *G06T 7/521* (2017.01);
(Continued)

(58) Field of Classification Search
CPC .................................................. G01S 7/4865
See application file for complete search history.

(56) References Cited

U.S. PATENT DOCUMENTS

| 8,009,871 B2 * | 8/2011 | Rafii | G06T 7/136 |
| | | | 382/106 |
| 8,471,895 B2 * | 6/2013 | Banks | G01S 17/89 |
| | | | 348/46 |

(Continued)

FOREIGN PATENT DOCUMENTS

| EP | 3207496 A1 | 8/2017 |
| WO | 2017160516 A1 | 9/2017 |

OTHER PUBLICATIONS

"International Search Report and Written Opinion Issued in PCT Application No. PCT/US19/068213", dated Apr. 14, 2020, 16 Pages.

*Primary Examiner* — Brian T Pendleton
*Assistant Examiner* — Frank Johnson
(74) *Attorney, Agent, or Firm* — Alleman Hall Creasman & Tuttle LLP

(57) ABSTRACT

A method to identify one or more depth-image segments that correspond to a predetermined object type is enacted in a depth-imaging controller operatively coupled to an optical time-of-flight (ToF) camera; it comprises: receiving depth-image data from the optical ToF camera, the depth-image data exhibiting an aliasing uncertainty, such that a coordinate (X, Y) of the depth-image data maps to a periodic series of depth values $\{Z_k\}$; and labeling, as corresponding to the object type, one or more coordinates of the depth-image data exhibiting the aliasing uncertainty.

19 Claims, 6 Drawing Sheets

(51) Int. Cl.
  *G06T 7/194* (2017.01)
  *G06K 9/62* (2006.01)
  *G06T 7/521* (2017.01)
  *H04N 5/225* (2006.01)

(52) U.S. Cl.
  CPC ......... *H04N 5/2256* (2013.01); *H04N 5/2356* (2013.01); *G06T 2207/10016* (2013.01); *G06T 2207/10028* (2013.01); *G06T 2207/10152* (2013.01); *G06T 2207/20081* (2013.01); *G06T 2207/20084* (2013.01); *G06T 2207/30196* (2013.01)

(56) References Cited

U.S. PATENT DOCUMENTS

| | | | |
|---|---|---|---|
| 9,062,969 B1 * | 6/2015 | Degges, Jr. | G01C 3/00 |
| 9,773,155 B2 * | 9/2017 | Shotton | G06K 9/00671 |
| 9,860,519 B2 * | 1/2018 | Liu | G01S 7/4808 |
| 10,191,154 B2 * | 1/2019 | Kadambi | G01S 17/32 |
| 10,401,496 B2 * | 9/2019 | Buettgen | G01S 17/36 |
| 10,445,593 B1 * | 10/2019 | Mathiesen | G06F 3/04847 |
| 2005/0195317 A1 * | 9/2005 | Myoga | H04N 5/2354 348/370 |
| 2011/0188028 A1 | 8/2011 | Hui et al. | |
| 2011/0234756 A1 * | 9/2011 | Adler | G06T 5/002 348/46 |
| 2011/0304841 A1 | 12/2011 | Bamji et al. | |
| 2012/0123718 A1 * | 5/2012 | Ko | G01S 17/89 702/85 |
| 2017/0061701 A1 * | 3/2017 | Mittal | G06T 5/002 |
| 2017/0309029 A1 * | 10/2017 | Wang | G06T 7/11 |
| 2017/0344835 A1 * | 11/2017 | Singh | G06K 9/00785 |
| 2018/0003807 A1 * | 1/2018 | Galera | G01S 7/4863 |
| 2018/0278843 A1 * | 9/2018 | Smith | G06F 3/012 |
| 2018/0329501 A1 * | 11/2018 | Marchenko | G06T 7/215 |
| 2020/0225673 A1 * | 7/2020 | Ebrahimi Afrouzi | B25J 9/1697 |

\* cited by examiner

SUBJECT TRACKING WITH ALIASED TIME-OF-FLIGHT DATA

CROSS REFERENCE TO RELATED APPLICATIONS

This application claims priority to U.S. Provisional Patent Application Ser. No. 62/791,640, filed Jan. 11, 2019, the entirety of which is hereby incorporated herein by reference for all purposes.

BACKGROUND

Some depth cameras operate according to the optical time-of-flight (ToF) principle, where distance to each point on a surface of a photographic subject is computed based on the length of the time interval in which light emitted by the camera travels out to the point and then back to the camera. An optical ToF camera measures this interval for many points on the surface and thereby assembles a depth image of the photographic subject. Typically, the power consumed by an optical ToF depth camera depends linearly on the number of exposures needed to acquire a suitably resolved depth image, because the imaged scene must be actively illuminated during each exposure.

SUMMARY

One aspect of this disclosure is directed to a method to identify one or more depth-image segments that correspond to a predetermined object type. The method is enacted in a depth-imaging controller operatively coupled to an optical time-of-flight (ToF) camera; it comprises: receiving depth-image data from the optical ToF camera, the depth-image data exhibiting an aliasing uncertainty, such that a coordinate (X, Y) of the depth-image data maps to a periodic series of depth values $\{Z_k\}$; and labeling, as corresponding to the object type, one or more coordinates of the depth-image data exhibiting the aliasing uncertainty.

Another aspect of this disclosure is directed to a depth-imaging controller operatively coupled to an optical time-of-flight (ToF) camera. The depth-imaging controller comprises: a shutter-acquisition engine configured to cause the optical ToF camera to acquire a series of raw shutters at an acquisition rate; and a segmentation engine configured to output a series of segmented depth images at segmentation rate, wherein one or more coordinates of each segmented depth image are labeled as corresponding to an object type, and wherein the acquisition rate is less than six times the segmentation rate.

Another aspect of this disclosure is directed to a depth-imaging controller operatively coupled to an optical time-of-flight (ToF) camera, the depth-imaging controller comprising: an illumination-control engine configured to cause a modulated emitter of the optical ToF camera to release modulated illumination of an invariant modulation frequency; a shutter-acquisition engine configured to cause the optical ToF camera to acquire a series of raw shutters while the modulated emitter releases the modulated emission of the invariant modulation frequency; and a segmentation engine configured to output a segmented depth image based on aliased depth data acquired from the series of raw shutters, wherein one or more coordinates of the segmented depth image are labeled as corresponding to the object type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

In recent years, optical time-of-flight (ToF) imaging has become the predominant depth-imaging technology, owing to the development of high-speed, high-resolution optical sensor arrays. 'Phase-based' optical ToF imaging is an important variant of this technique, in which depth is computed based on the phase lag of modulated light reflected back from the subject. Optical ToF imaging typically requires six to nine exposures of a sensor array to pulsed infrared emission, with each exposure consuming power and dissipating heat. This disclosure presents a novel depth-image segmentation technology applicable to depth images acquired with fewer than the normal number of exposures (e.g., with three exposures). It enables each depth image of a subject to be resolved into labeled portions, which may, in the case of video, be tracked from frame to frame. The approach herein achieves robust segmentation using only a fraction of the typical number of exposures, thereby reducing both power and cooling requirements for the optical ToF camera, and increasing bandwidth.

Figure 1:
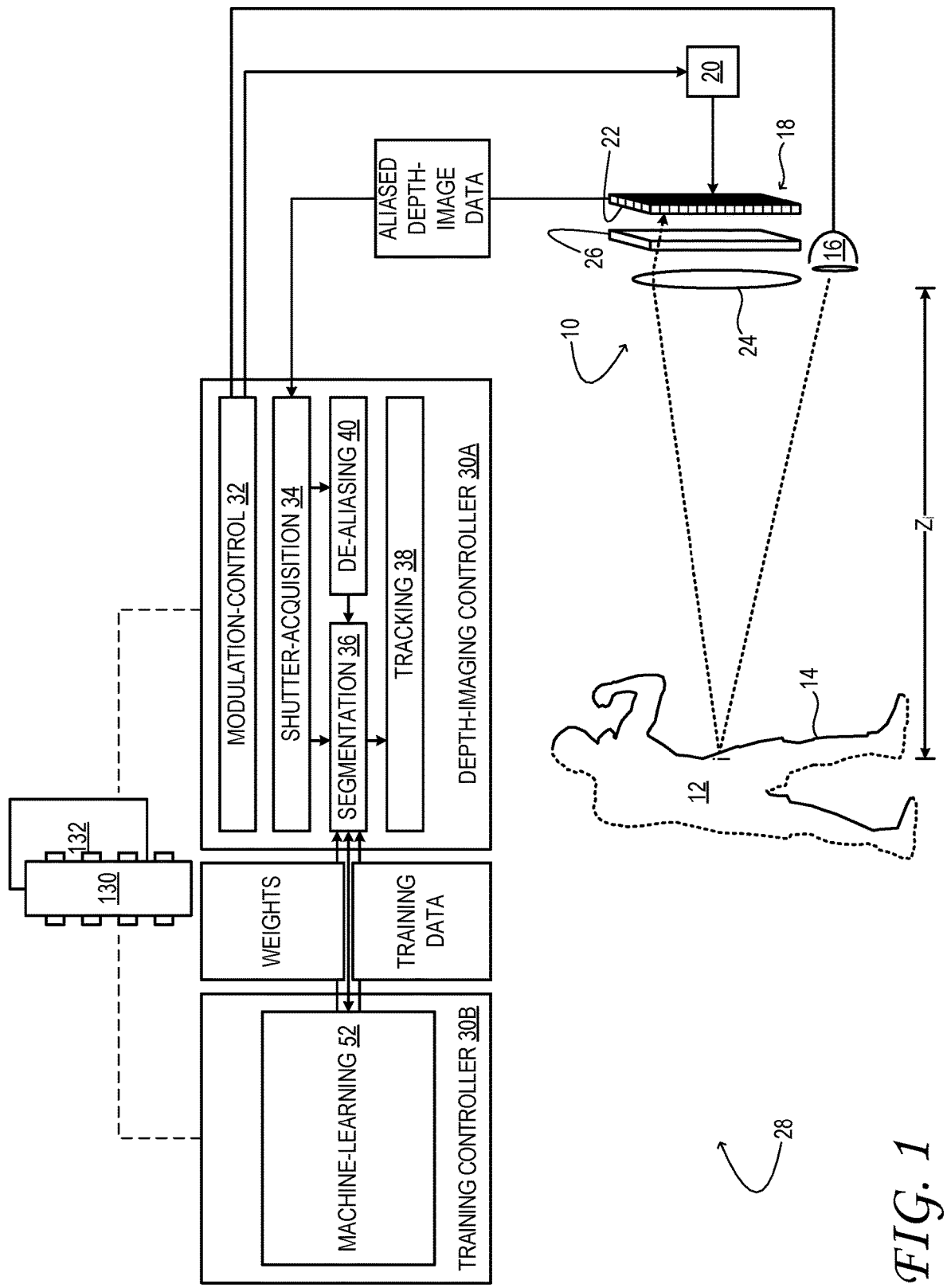
FIG. 1 shows aspects of an example optical ToF camera in an example implementation environment.

FIG. 1 schematically shows aspects of an optical ToF camera 10 arranged to sight photographic or videographic subject 12. The optical ToF camera, in combination with operatively coupled control logic, is configured to resolve distance Z to a plurality of points i on visible surface 14 of the subject. To achieve phase-based ToF imaging, optical ToF camera 10 includes a modulated light emitter 16 and a sensor array 18 with a modulated electronic shutter 20. The light emitter may be an infrared (IR) light-emitting diode (LED) or laser, and the sensor array may be a high-resolution array of complementary metal-oxide semiconductor (CMOS) sensor elements 22. Set behind objective lens 24 and wavelength filter 26, the sensor array is configured to image light from the light emitter that reflects off surface 14 and back to the camera. Other ToF cameras fully consonant with this disclosure may include different optical, light-emitter and/or sensor-array variants—e.g., a charge-coupled device (CCD) sensor array or a microlens objective array.

The term 'electronic shutter', as used herein, may refer to a controlled voltage bias applied concurrently to certain electrode structures of the various sensor elements 22 of sensor array 18. In some examples, the electrode structures receiving the controlled voltage bias may include current collectors that, depending on the level of the voltage bias, cause photoelectrons created within the sensor elements to drift to the current collectors and be measured as current. In some examples, the electrode structures receiving the controlled voltage bias may include gates that, depending on the level of the voltage bias, encourage the photoelectrons to drift towards the current collectors.

In an example implementation, light emitter 16 and electronic shutter 20 of sensor array 18 are modulated at one or more predetermined frequencies, with a predetermined, angular phase offset φ controlling the retardance of the electronic-shutter modulation relative to the light-emitter modulation. In some examples, 'modulation', as used herein, refers to a sinusoidal or digitized quasisinusoidal waveform, which simplifies analysis. This feature is not strictly necessary, however, as modulation by other waveforms may be used instead, periodic waveforms being reducible to a sum of sinusoids according to the Fourier principle.

In the configuration of FIG. 1, sensor array 18 images the component of the reflected light that lags the emitter modulation by the angle φ. One image captured in this manner is called a 'raw shutter.' A raw shutter may be represented as a numeric array with a φ-specific intensity value $V_i$ provided for each sensor element and associated with coordinates ($X_i$, $Y_i$) that specify the position of that sensor element in the sensor array. By capturing three consecutive raw shutters with three different phase offsets φ, it is possible to conditionally estimate the distance $Z_i$ between the depth camera and the surface point imaged at each sensor element i. The estimation routine implicitly or explicitly estimates the actual phase lag φ* of the light reflected back to each sensor element. A 'phase image' is a numeric array with (φ*), specified for each sensor element i and associated with coordinates ($X_i$, $Y_i$) that specify the position of that sensor element in the sensor array. Using data from a phase image or component raw shutters, it is possible to solve for the depth using (φ*/4π)+(N/2)=($Z_i$ f/c), where c is the velocity of light, f is the modulation frequency, and N is a non-negative integer.

The solution above is unique when the entire range of depth values $Z_i$ is no larger than half of the distance traveled by light in one modulation period, c/(2 f), in which case N is a constant. Otherwise, the solution is underdetermined and periodic. In particular, surface points at depths that differ by any integer multiple of c/(2 f) are observed at the same phase lag φ*. Depth-image data resolved only to that degree—e.g., data from a phase image or corresponding triad of raw shutters—is said to be 'aliased.'

In order to resolve depth in ranges larger than c/(2 f), it is possible to repeat the measurement using raw shutters acquired at different modulation frequencies. In some examples three frequencies may be used; in other examples two frequencies are sufficient. The combined input from all of the raw shutters (nine in the case of three frequencies, six in the case of two) is sufficient to uniquely determine each $Z_i$. Redundant depth-imaging of the same subject and image frame to provide a non-periodic depth estimate is called 'de-aliasing'. A de-aliased depth image may be represented as a numeric array with a distance value $Z_i$ provided for each sensor element and associated with coordinates ($X_i$, $Y_i$) that specify the position of that sensor element in the sensor array. An aliased depth image may be represented by the same type of structure, subject to a 'phase wrap' uncertainty in each $Z_i$.

Despite the advantages of de-aliasing for extending the observable depth range of optical ToF camera 10, de-aliasing also introduces some disadvantages. In particular, optical ToF cameras used in embedded devices may operate under tight thermal and power budgets, where each raw shutter is costly, primarily because of the power consumed by the light emitter for illumination of the subject. This issue is especially significant when the optical ToF camera is integrated into a battery-powered device. When de-aliasing is required for downstream tasks, such as semantic segmentation of the subject into different classes—e.g., for tracking a person's hands or body—the maximum frame rate of the optical ToF camera may be limited by power and/or other constraints. In some examples, de-aliased depth frames may be available at only thirty frames per second, although the sensor array itself is capable of much greater bandwidth. Furthermore, no series of raw shutters is ever captured instantaneously; under conditions of rapid relative motion between the subject and the optical ToF camera, the assumptions used to estimate the depth become invalid, leading to motion artifacts.

In view of the foregoing issues, systems and methods are presented herein to use aliased depth-image data for segmentation and tracking operations. Instead of de-aliasing the depth-image data by redundant phase-image acquisition prior to segmentation, these methods operate directly on individual aliased depth images, or on the component raw shutters themselves, achieving robust segmentation into classified depth-image segments. Model fitting may then be applied to track the motion of the classified depth-image segments from frame to frame, in depth-video applications. In examples in which the depth-imaging subject includes a human being, classified depth-image segments corresponding to the hands may be segmented from the rest of the subject. In depth-video applications, the hand segments can then be tracked through the sequence of depth-image frames and/or fit to a kinematic model. Tracked hand segments can be used as input for virtual-reality video games or as gesture input for controlling a computer, for example. Naturally, the approach herein is not limited to the tracking of human hands, but extends to various other segmentation and tracking tasks that may be performed on the aliased output of a phase-based optical ToF camera.

Accordingly, a series of methods is presented herein to identify one or more depth-image segments in data received from an optical ToF camera and, optionally, to track the one or more depth-image segments through a sequence of depth-video frames. Such methods may be enacted by a depth-imaging controller configured to receive and process aliased depth-image data from an optical ToF camera. In some examples, the depth-imaging controller and the optical ToF camera may be integrated together in the same device. In other examples, the optical ToF camera may be peripheral to the device that contains the depth-imaging controller. FIG. 1 shows an example implementation environment 28 for the methods herein. Implementation environment 28 includes a depth-imaging controller 30A having a modulation-control engine 32, a shutter-acquisition engine 34, a segmentation engine 36, and, optionally, a tracking engine 38 and a de-aliasing engine 40. The depth-imaging controller may be arranged in virtually any electronic device: a personal computer, game system, laptop or tablet computer, smart phone, still camera, video camera, or virtual-reality headset, for example. Implementation environment 28 also includes a training controller 30B that may be used to train the segmentation engine of the depth-imaging controller during an initial training phase. The training and depth-imaging controllers may be arranged in the same electronic device, or in different devices classifiable from each other.

Figure 2:
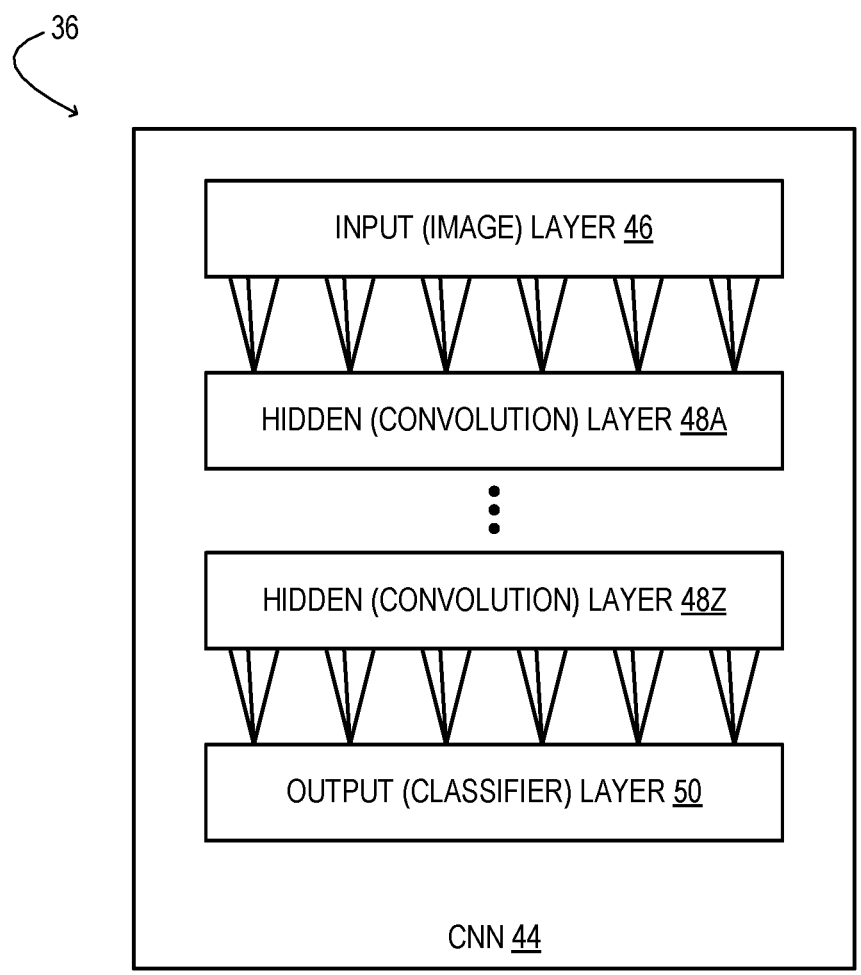
FIG. 2 shows aspects of an example segmentation engine of a depth-imaging controller based on a fully convolutional neural network.

FIG. 2 shows aspects of an example segmentation engine 36 of depth-imaging controller 30A. Segmentation engine 36 is based on a fully convolutional neural network (CNN) 44 having an input layer 46, a series of hidden layers 48, and an output layer 50. Each layer of the CNN includes an array of logic constructs called 'neurons'. Each neuron i of the input layer may correspond to coordinates $(X_i, Y_i)$ of aliased depth-image data provided as input. During operation of the segmentation engine, an aliased depth value $Z_i$ is received at the node corresponding to coordinates $(X_i, Y_i)$ of input layer 46 and transformed successively through each of the series of hidden layers 48. Each neuron of a hidden layer receives its input from neurons of the layer above, enacts a logic operation on the input, and passes an output to neurons of the layer below. Each neuron of output layer 50 provides a classification label $C_i$ that is attached to coordinates $(X_i, Y_i)$.

In contrast to the neurons of a generic neural network, each neuron of CNN 44 receives input only from the neuron directly above it, or from a close neighbor of that neuron. This feature reflects the fact that any classification on coordinates $(X_i, Y_i)$ of a depth image depends more strongly on phase information close to $(X_i, Y_i)$ than on phase information from distant parts of the image.

Among the hidden layers 48 of CNN 44 are one or more convolution, or filter, layers. Each convolution layer enacts a filtering operation by computing a dot product between its vector of inputs and a filter vector of the same dimensions. The elements of each filter vector are adjustable parameters called 'filter weights'. During training of the CNN, the filter weights are optimized in a closed-loop manner, so as to cause the CNN to converge onto known, ground-truth classifications for a set of training images provided as input. More specifically, a global error is computed for classification of the training images based on a trial set of filter weights, by comparing the output versus the ground-truth classifications. Then each filter weight is adjusted so as to reduce the global error, in a process known as back propagation. To facilitate back-propagation, the filtering and/or other logic function enacted by each neuron may be required to be differentiable with respect to the associated filter weight. In some examples, each neuron may include logic configured to compute its own derivatives. Such derivatives may be used in parameter optimization procedures, such as the 'steepest descent' method, among others.

CNN 44 may include a large number of filters arranged in hidden layers 48. In contrast to a generic neural network, where the filter vectors of each neuron are optimized independently, the filter vectors in CNN 44 may be constrained to reflect the inherent similarities among the individual sensor elements of a sensor array. Provided that a sufficient quantity of labeled data is available during the training phase, a CNN can potentially learn to cope with noise and/or distortion due to subject motion and/or other sources. In addition, CNNs are naturally invariant to translational shifting in the component images at the input layer, providing tolerance to variances and offsets among the various component images (training and operational).

Returning briefly to FIG. 1, machine-learning engine 52 of training controller 30B may be configured to supply appropriate training data to a segmentation engine that is being trained during the training phase. Such training data may include aliased depth-image data of one or more training subjects, with ground-truth classification labels attached to the coordinates. The machine-learning engine may also be configured to compute the global error between the classified output of the segmentation engine (from output layer 50 of CNN 44) and the vector of ground-truth classification labels. Further, the machine-learning engine may be configured to incrementally refine the filter weights, via back propagation, and to supply the refined filter weights to the segmentation engine. In this manner, machine learning engine 52 may be configured to train a segmentation engine to appropriately label coordinates of aliased depth-image data. Once trained, the segmentation engine may be used, as part of the depth-imaging controller 30A to label new aliased depth images acquired by optical ToF camera 10. Additional aspects and variants of the training process are described further below.

Figure 3:
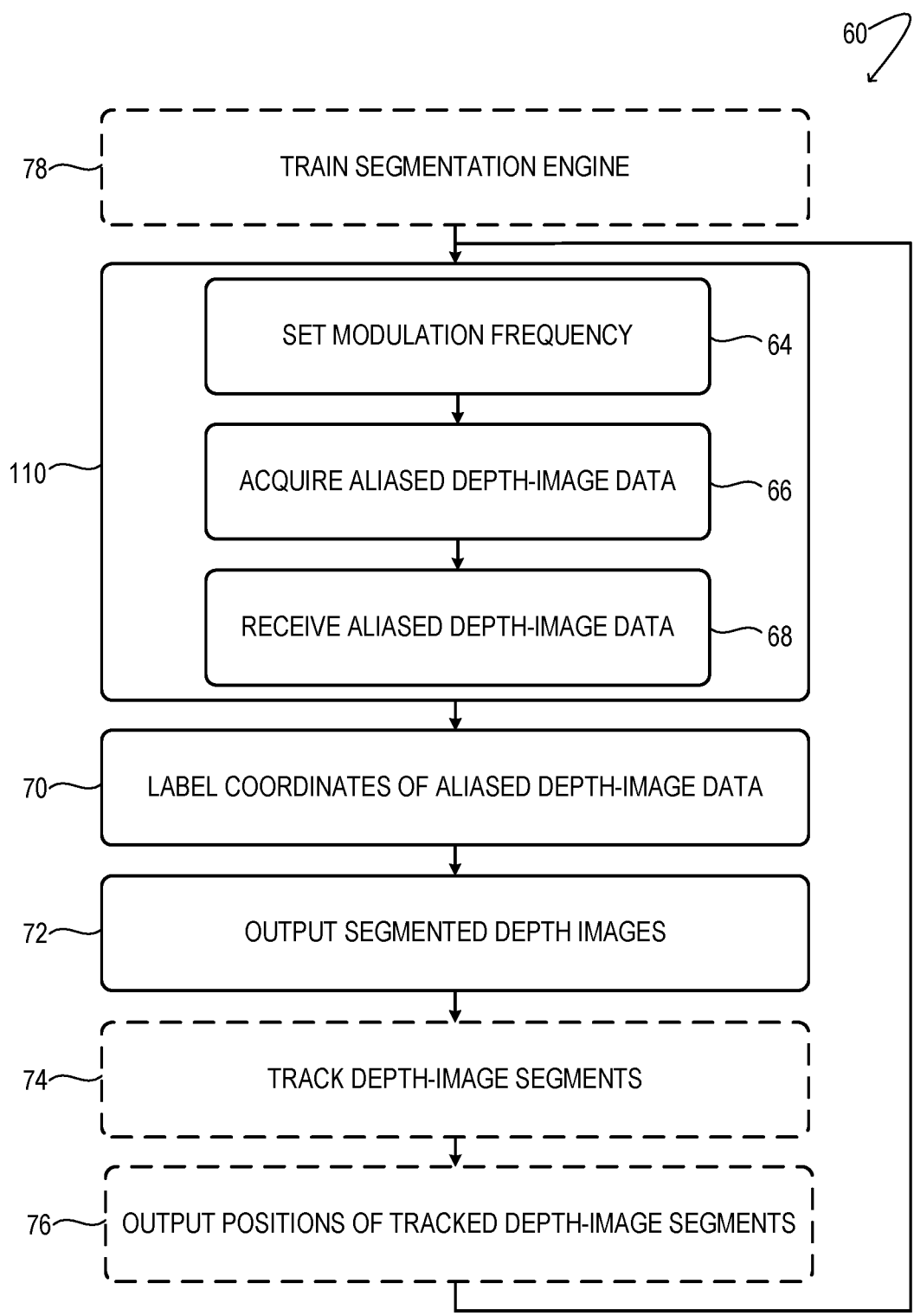
FIG. 3 illustrates aspects of an example method to identify one or more depth-image segments from an optical ToF camera that correspond to a predetermined object type.

FIG. 3 illustrates an example method 60 to identify one or more depth-image segments that correspond to a predetermined object type. The terms 'object type' and 'class' are used interchangeably herein. Accordingly, the terms 'segmentation' and 'classification' are also used interchangeably. Method 60 may be enacted in a depth-imaging controller operatively coupled to an optical ToF camera, as described above. Portions of method 60 that may be omitted in some implementations or operating scenarios are shown in dashed boxes in FIG. 3. For ease of understanding, these portions will be described last.

At 64 of method 60, the modulation-control engine of the depth-imaging controller sets the modulation frequency of the optical ToF camera to a predetermined frequency, which causes the modulated emitter of the optical ToF camera to release modulated illumination of the predetermined modulation frequency and also modulates the electronic shutter of the sensor array to the same, predetermined modulation frequency. In some examples, the predetermined modulation frequency may be a constant (i.e., invariant) frequency.

At 66 the shutter-acquisition engine of the depth-imaging controller triggers the optical ToF camera to acquire aliased depth-image data. More particularly, the shutter-acquisition engine causes the optical ToF camera to acquire a series of raw shutters at an acquisition rate $R_A$, averaged over the period of acquisition of the series of raw shutters. In some examples, a series of three raw shutters acquired in rapid succession over a predetermined acquisition duration $T_A$ may be processed to yield an aliased depth image. As described above, each of the three raw shutters may differ with respect to the phase offset $\phi$ that characterizes the lag in the electronic-shutter modulation with respect to the emitter modulation. In some examples, the optical ToF camera may operate at an invariant modulation frequency during the acquisition duration $T_A$, in which the series of raw shutters are acquired.

At 68 the segmentation engine of the depth-imaging controller receives the aliased depth-image data from the optical ToF camera. In some examples, the aliased depth-image data received from the optical ToF camera may include a series of raw shutters acquired by the optical ToF camera at the predetermined modulation frequency. In other examples, the aliased depth-image data received at 68 may have been pre-processed into an aliased depth image derived from the series of raw shutters acquired at the predetermined modulation frequency. Whether received as raw shutters or as an aliased depth image, the depth-image data from the optical ToF camera may exhibit an aliasing uncertainty, such that a coordinate (X, Y) of the depth-image data maps to a periodic series of depth values $\{Z_k\}$. More specifically, in examples in which the optical ToF camera is a phase-based optical ToF camera operated at a modulation frequency f, adjacent elements of the periodic series of depth values may differ by a phase wrapping of $c/(2f)$, where c is the speed of light in air.

At 70 the segmentation engine of the depth-imaging controller labels one or more coordinates of the aliased depth-image data as corresponding to a recognized object type from among a predetermined set of object types. Coordinate labels may be attached to the aliased depth data which still exhibits the aliasing uncertainty—i.e., without first attempting to resolve the aliasing uncertainty. In some implementations, segmentation labels may be associated to corresponding coordinates of a derived data structure that does not include either aliased or de-aliased depth-image data.

The nature and extent of the predetermined set of object types is not particularly limited. In some examples, the set may include one or more foreground object types and one or more background object types. Accordingly, the act of labeling may differentiate coordinates corresponding to a particular foreground object type from coordinates corresponding to one or more background object types. A foreground object type may correspond to a human being, for example, while a background object type may correspond to a wall, furniture, etc.

In some examples, coordinate labeling at 70 may provide still finer recognition. The labeling may identify, for instance, coordinates corresponding to a human hand. In some examples, the predetermined set of object types that the segmentation engine is configured to recognize may be defined based on the application context requesting the segmentation. For instance, in a virtual-reality video game in which the positions of a player's hands and head are to be tracked and used as real-time input, the predetermined set of object types may include a human hand and a human head.

In general, coordinate labeling at 70 may serve to classify one or more depth-image segments of the aliased depth-image data as one or more instances of a recognized object type. For example, one locus of coordinates, each labeled as corresponding to a human-being object type may be defined as person A, while another locus of coordinates, each labeled as corresponding to a human-being object type, may be defined as person B.

Depth-image segments may be identified (i.e., labeled) using any appropriate data structure, resulting in a 'segmented depth image'. In one example, a segmented depth image may be represented as an array with a distance value $Z_i$ and a class value $C_i$ provided for each sensor element and associated with coordinates $(X_i, Y_i)$ that specify the position of that sensor element in the sensor array. One class value may be specified for coordinates identified as the hands, another for coordinates identified as the head, etc. In some examples, multi-level classifiers may be used, for example classifying all hand coordinates with a hand class value, and then further classifying a thumb coordinate a thumb class value.

At 72 the segmentation engine of the depth-imaging controller outputs a series of segmented depth images in which one or more coordinates are labeled as corresponding to a recognized object type. In some examples, the segmentation engine may be configured to output at least one segmented depth image within an output duration $T_O$, equal in length to the acquisition duration $T_A$ over which a corresponding sequence of three raw shutters was captured (at 66 of method 60). In some examples, the segmentation engine may be configured to output a series of segmented depth images at segmentation rate $R_O$ averaged over the period of outputting the series of segmented depth images. Because segmentation is achieved without requiring a doubly or triply redundant set of raw shutters (i.e., 6 or 9 raw shutters) the segmentation rate $R_O$ may be greater than one-sixth of the acquisition rate $R_A$. In some examples, the segmentation rate may approach or even reach one-third of the acquisition rate.

Optional step 74 may be enacted in implementations in which the depth-imaging controller receives a sequence of aliased depth-video frames from the optical ToF camera. At 74 the tracking engine of the depth-imaging controller tracks one or more of the classified depth-image segments through the sequence of depth-video frames. In one non-limiting example, the tracking engine may aggregate clusters of nearby coordinates having the same class value $C_i$ into one or more classified loci, which are then tracked from frame to frame. For example, the tracking engine may identify a cluster of coordinates on the right side of a depth-image frame and a cluster of coordinates on the left side of the same depth-image frame, each with a class value corresponding to a human hand. The tracking engine may then associate the cluster on the right side with a human subject's left hand and the subject on the left side with the human subject's right hand. The centroid of each cluster may then be computed and associated with the human subject's left and right hand positions, respectively. In some examples, the process of computing a classified locus for a given depth-image frame may be influenced by the position of the same classified locus in previously acquired depth-image frames. In one example, the trajectory of a hand or head centroid may be constrained to a physically or anatomically plausible trajectory for a hand or head.

At optional step 76, the tracking engine of the depth-imaging controller outputs one or more positions of the tracked classified loci to the application context requesting the tracking. In some implementations, additional and/or alternative data derived from the one or more classified depth-image segments may also be returned. Examples include pose, posture and/or gesture aspects (hand closed, open flat spread, etc.).

At optional step 78, in advance of any applied segmentation activity, the machine-learning engine of the training controller may be used to train the segmentation engine of the depth-imaging controller. Two different methods for training the segmentation engine will now be described, with reference to FIGS. 4 and 5. Each method may be enacted within method 60, as a particular instance of step 78. Each method applies non-exclusively to segmentation engines based on a neural network.

Figure 4:
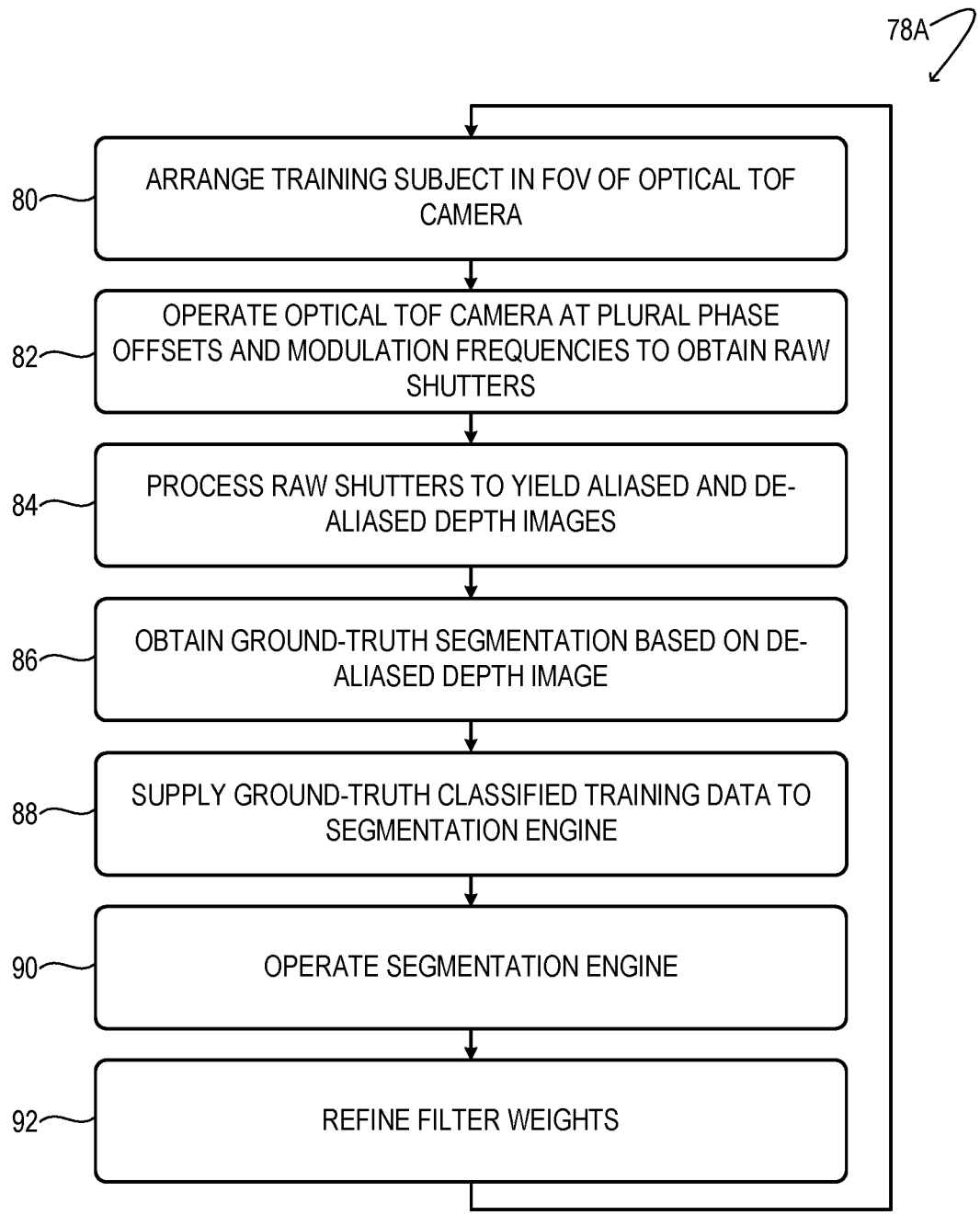
FIGS. 4 and 5 illustrate example methods to train a segmentation engine of a depth-imaging controller to segment an aliased depth image into one or more classified depth-image segments.

FIG. 4 illustrates an example method 78A to train a segmentation engine of a depth-imaging controller. In method 78A, the segmentation engine is trained to replicate, onto an aliased depth image of a training subject, a ground-truth segmentation label derived from a corresponding, externally labeled, de-aliased depth image of the training subject at corresponding coordinates. Here, the aliased depth image and the ground-truth segmentation label are provided as training data to the segmentation engine.

At 80 of method 78A, a training subject is arranged within the field of view of an optical ToF camera. The training subject may be application-context specific. In other words, if the application context requires resolution of classified depth-image segments of a human subject (e.g., hands, head), then the training subject may include a human subject captured in an appropriate posture to reveal the hands and head. At 82 the optical ToF camera is operated at plural phase offsets and modulation frequencies in order to acquire a series of raw shutters of the training subject. At 84 the series of raw shutters is processed to yield at least one de-aliased depth image in addition to a plurality of aliased depth images of the training subject. At 86 ground-truth segmentation is obtained based on the de-aliased depth image of the training subject.

In some examples, a human trainer manually classifies one or more depth-image segments corresponding to recognized object types in the de-aliased depth image of the training subject, to obtain the ground-truth classification. In other examples, the ground-truth classification may be computed via an intermediate modeling stage, in which a point cloud from the de-aliased depth image is fit to an appropriate training-subject model. With human training subjects, for example, a skeletal model representing the various joints and skeletal segments of the human body may be used. Ground-truth segmentation data may then be computed based on proximity to the modeled joint data. For example, the hand positions may be revealed by the model, which, when registered to the de-aliased depth image, shows which coordinates are to be classified as hands. The above are only examples, as training data may be labeled using any suitable supervised, semi-supervised, and/or unsupervised machine learning training approach.

At 88 of method 78A, the machine-learning engine of the training controller supplies ground-truth classified training data to the segmentation engine of the depth-imaging controller. The ground-truth classified training data may include aliased depth-image data with ground-truth classification labels from a corresponding de-aliased depth image attached to corresponding coordinates. At 90 the segmentation engine is operated, and the machine-learning engine computes the global error between the output of the segmentation engine and the vector of ground-truth classification labels. At 92 the machine-learning engine incrementally refines the filter weights via back propagation and supplies the refined filter weights to the segmentation engine.

Subsequent to 92, the process of depth-image acquisition, ground-truth classification, and training of the segmentation engine is repeated for a plurality of training subjects and/or poses of the training subject until the segmentation engine is adequately trained. Each set of training data may additively contribute to the solution. Any suitable figure of merit, such as a pixel-wise least-squares deviation of segmentation accuracy, may be used to assess the confidence of the segmentation.

Figure 5:
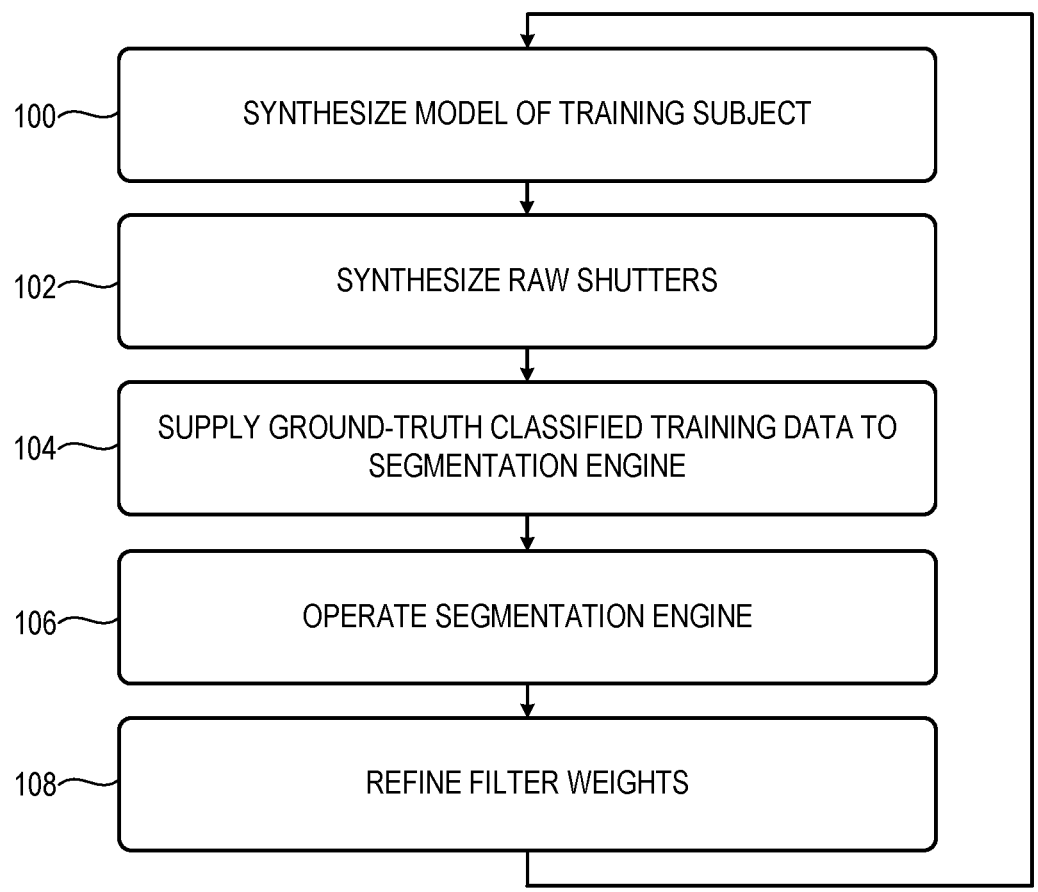

FIG. 5 illustrates another example method 78B to train a segmentation engine of a depth-imaging controller. In method 78B, the segmentation engine is trained to attach, onto coordinates of a simulated aliased depth image of a training subject, a segmentation label consistent with a ground-truth segmentation label provided for those coordinates. Here, the simulated aliased depth image and ground-truth segmentation labels are provided as training data to the segmentation engine.

At 100 of method 78B, a computer-graphics engine is used to synthesize a model of a training subject (e.g., a human being) in a pose appropriate to the expected application context in which the segmentation engine will operate. This step effectively predetermines the ground-truth segmentation that will ultimately appear in the training data, inasmuch as the pose selection will determine the positions of the various classified depth-image segments—e.g., hand positions, foot positions, etc.—in each training image. This is the only human input, if any, required to train h segmentation engine in method 78B. In some examples, the human input may be eliminated or greatly reduced by having the synthesized model or models automatically move through a range of possible poses to generate corresponding synthesized training data for each of the possible poses (vide infra). Accordingly, a very large body of training data may be assembled and labeled with minimal human effort.

At 102 of method 78B, an appropriate series of raw shutters are synthesized (i.e., numerically simulated) for the synthetic training subject. The synthetic raw shutters may simulate operation of an optical ToF camera at plural phase offsets and a predetermined modulation frequency.

When generating synthetic raw-shutter data, additional computer-graphics techniques may be used to simulate the operation of the optical ToF camera. In particular, a ray-tracing engine may be used to simulate the modulated emission from the optical ToF camera, and what the sensor array would image at each frame.

At 104 of method 78B, the machine-learning engine of the training controller supplies ground-truth classified training data to the segmentation engine of the depth-imaging controller. The ground-truth classified training data may include aliased depth-image data with ground-truth classification labels attached automatically to appropriate coordinates based on the output of the computer-graphics engine.

At 106 the segmentation engine is operated, and the machine-learning engine computes the global error between the output of the segmentation engine and the vector of ground-truth classification labels. At 108 the machine-learning engine incrementally refines the filter weights via back propagation and supplies the refined filter weights to the segmentation engine.

Subsequent to 108, the process of synthesis of the training subject, simulation of aliased depth-image data, ground-truth classification, and training of the segmentation engine is repeated for a plurality of synthetic training subjects and/or poses of the training subject until the segmentation engine is adequately trained. The process may also be repeated for a plurality of predetermined modulation frequencies. Each set of training data may additively contribute to the solution. Any suitable figure of merit, such as a pixel-wise least-squares deviation of segmentation accuracy, may be used to assess the confidence of the segmentation.

In training methods 78A and 78B, the machine-learning engine of a training controller supplies training data to the segmentation engine of the depth-imaging controller which is to be trained. Naturally, the training is most efficacious when the depth-image data used for the training is acquired by, or simulated for, the same type of optical ToF camera that will be used with the trained segmentation engine. In scenarios in which a segmentation engine trained for one optical ToF camera is to be used with a differently configured replacement camera, the segmentation engine may be retrained for the replacement camera, using appropriate training data. Conversely, if it is expected that plural depth-imaging controllers are to be used with similar or identical optical ToF cameras, then it would be unnecessary to train the segmentation engines of each depth-imaging controller individually. Rather, a prototype segmentation engine may be trained for the expected class of optical ToF camera, resulting in a set of optimized filter weights or other parameters. Then, the set of optimized filter weights may be included with the entire plurality of depth-imaging controllers at the point of manufacture. Alternatively, or in addition, a set of optimized filter weights or other parameters appropriate for a given class of optical ToF camera, and obtained by training a prototype segmentation engine according to the methods herein, may be provided as data to be supplied with any optical ToF cameras of that class.

Figures 6, 7:
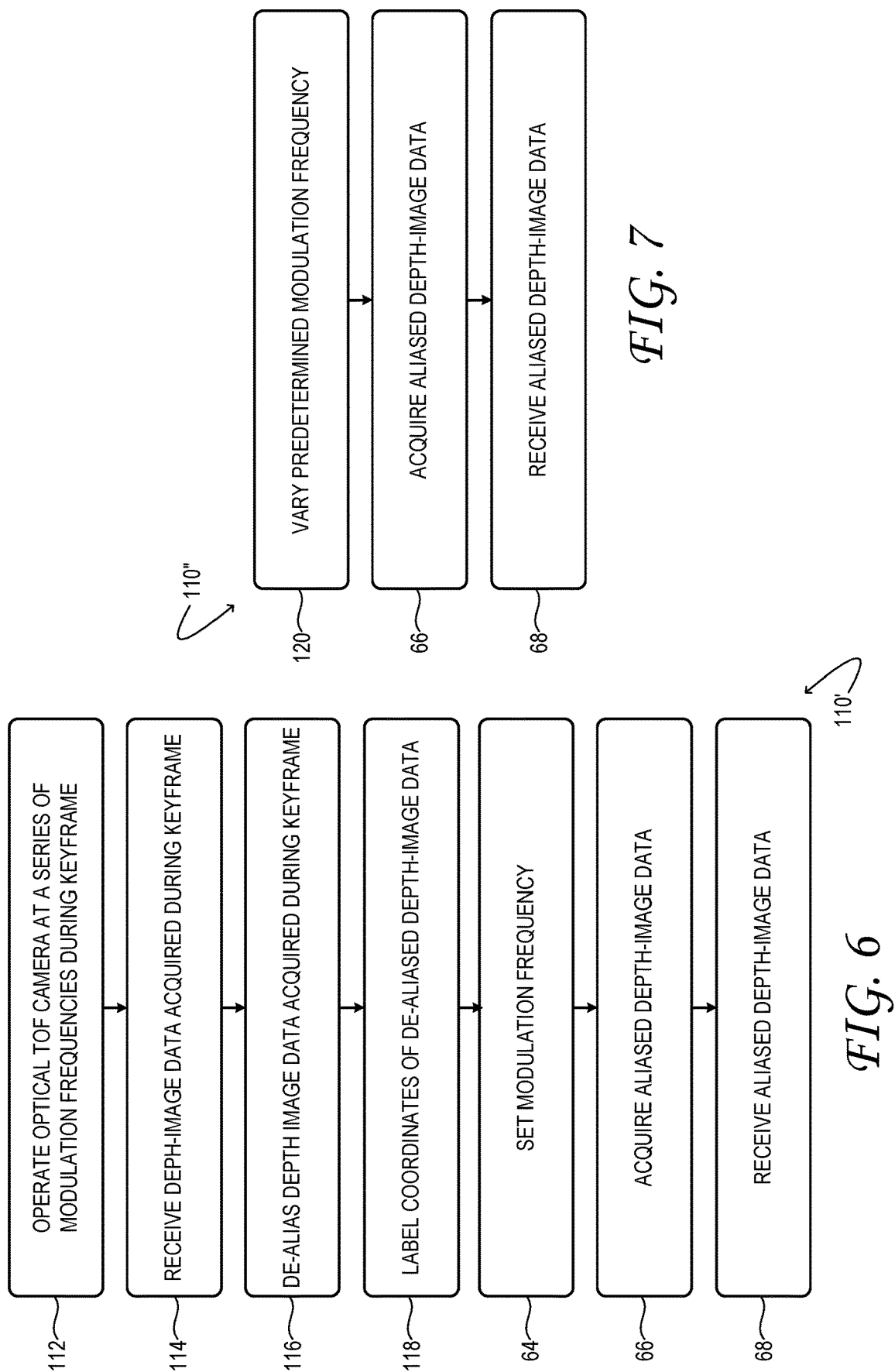
FIGS. 6 and 7 illustrate alternative aspects of the example method of FIG. 3.

Two additional variants of method 60 will now be considered, with reference to FIGS. 6 and 7. The block labeled 110 in FIG. 3 illustrates one mode in which the depth-imaging controller may obtain and segment aliased depth-image data from an optical ToF camera. Block 110' of FIG. 6 and block 110" of FIG. 7 illustrate other such modes, which the depth-imaging controller may execute in lieu of the mode of block 110. In some examples, a given depth-imaging controller may be configured to execute any or all of blocks 110, 110', and 110", depending on the operating scenario.

Turning first to FIG. 6, at 112 the modulation-control engine of the depth-imaging controller operates the optical ToF camera at a series of modulation frequencies during a keyframe of a depth-video acquisition. At 114 the shutter-acquisition engine of the depth-imaging controller receives depth-image data acquired by the optical ToF camera during the keyframe. At 116 the de-aliasing engine of the depth-imaging controller coordinately processes the depth-image data acquired during the keyframe to return a de-aliased depth-image. At 118 the segmentation engine of the depth-imaging controller labels one or more coordinates of the de-aliased depth-image data as corresponding to a recognized object type from among a predetermined set of object types.

Subsequent to 118, execution of the method continues at 64, ff, as described with reference to FIG. 3. In the variant of FIG. 6, however, the labeling of the one or more coordinates of the depth-image data acquired subsequent to the keyframe (70 of FIG. 3) is further based on the labeled coordinates of the de-aliased depth-image. In this scenario, the segmentation engine may be trained to accept, as additional input, classified segmentation labels from a previous frame (e.g., the keyframe), in addition to the aliased depth image for a current frame. In some scenarios, a new keyframe analysis may be repeated based on various criteria, such as a predetermined number of frames elapsing or a segmentation confidence dropping below a predetermined threshold. Using this hybrid approach, the time- and energy-savings approach of segmenting based on aliased depth images may be supplemented with the robust approach of segmenting based on de-aliased depth images.

In some pies (not necessarily limited to the variant of FIG. 6), additional information may be obtained based on the segmentation of aliased depth-image data combined with known properties of one or more classified segments. More specifically, if the basic geometry of a classified segment is predictable, then the labeling of that segment may provide enough information to enable de-aliasing of at least the labeled segment. Notably, the partial de-aliasing achieved in this manner may require no additional raw-shutter acquisition. For example, if the segmentation engine identifies and labels a human hand in aliased depth-image data, then the mere fact that the hand must be spatially continuous in Z implies that the actual depth values of all labeled coordinates of that segment are interrelated and may be known relative to each other. To put it another way, the actual depth value of each coordinate (X, Y) of a labeled segment is not free to vary independently within the periodic series $\{Z_k\}$ associated with that coordinate in the aliased depth image data. Rather, the actual depth value corresponding to each labeled coordinate is determined up to a constant, which may be ascertained in various ways—e.g., based on heuristics. In the particular context of the variant of FIG. 6, the value of the constant may be determined based on already de-aliased depth-image data tracked to the same classified segment—e.g., data derived from the de-aliased keyframe.

Accordingly, method 60 may further comprise selecting one depth value from among the periodic series of depth values $\{Z_k\}$ associated with a coordinate of a classified depth-image segment, to maintain a continuity of the classified depth-image segment. The method may further comprise constructing and outputting de-aliased depth-image data corresponding to at least the portion of the aliased depth-image data corresponding to the classified depth-image segment. In this context, constructing the de-aliased depth image data may include inserting the selected depth value at a coordinate (X', Y') of the de-aliased depth image data corresponding to the coordinate (X, Y) of the aliased depth image data.

Turning now to FIG. 7, at 120 of method 60, the modulation-control engine of the depth-imaging controller varies the predetermined modulation frequency of the optical ToF camera from its current value. The predetermined modulation frequency may be varied incrementally and/or periodically, for example. Changing the modulation frequency between triads of raw shutters that each correspond to a single phase image does not change the principle of operation of method 60. However, such change may ensure that the modulation frequency is not permanently fixed to a value or range that gives inferior segmentation results for a particular subject and/or environment. Rather, if such a value or range exists, it will adversely affect only a fraction of segmented output.

This approach may be particularly useful for depth-video acquisition, in which each aliased depth image received by the shutter-acquisition engine is one of a sequence of aliased depth-video frames, each frame being derived from a corresponding series of raw shutters acquired at a predetermined modulation frequency. In this example, the predetermined modulation frequency may be varied incrementally and periodically across the sequence of aliased depth images. In other examples, the predetermined modulation frequency may be varied conditionally, based on an assessed confidence of the segmentation process. In particular, the predetermined modulation frequency may be maintained at its current value if the confidence is above a threshold, but advanced if the confidence falls below the threshold. Subsequent to 120, execution of the method continues at 66, ff, as described with reference to FIG. 3.

No aspect of the foregoing drawings or description should be interpreted in a limiting sense, for numerous variations, extensions, and omissions are also envisaged. Although CNN 44 is an appropriate basis for segmentation engine 36, other machine-learning models and strategies may be used instead. Alternative segmentation engines may employ an autoencoder, decision forest, or support vector machine, as non-limiting examples. In still other examples, the segmentation engine need not be trained using machine-learning per se. Alternatively, or in addition, the segmentation engine may leverage any appropriate hard-coded algorithm or heuristic to achieve robust segmentation of aliased depth-image data. In depth-video applications, for instance, a preferred depth value may be selected from among a periodic series of depth values so as to maintain a continuity of any previously identified depth-image segment across a series of depth-image frames. In some examples, this strategy may be coupled to low-level processing of the raw shutters—e.g., auto-adjusting the zero phase offset to prevent a previously recognized hand segment from crossing a phase boundary. For example, if a hand is expected or identified at a particular depth, the zero phase offset may be auto-adjusted to the hand's previously expected or identified depth.

The methods herein provide several advantages over the approach in which de-aliased depth images are used for tracking the classified depth-image segments of a photographic subject. First, the required camera power is reduced, as only three raw shutters are required to resolve each aliased depth image, as opposed to six or nine. Second, the optical ToF camera can be operated at a higher frame rate, resulting in more accurate tracking in downstream tasks. For instance, the sensor array of an optical ToF camera may be operated at forty-five or sixty frames per second, rather than thirty, which gives an improved user experience with more accurate tracking. Third, the computational cost of processing the raw shutters and de-aliasing the depth estimate is obviated completely. Fourth, burst energy of light emissions may be increased for each shutter, without increasing the overall energy that would be required if more emissions and shutters were used, thus potentially improving performance in environments with difficult ambient light. Moreover, artifacts due to relative motion of the subject versus the optical ToF camera may be significantly reduced, leading to a more temporally localized signal that can improve tracking accuracy.

Returning again to FIG. 1, the methods and processes herein may be implemented by a system of one or more computers. In particular, such methods and processes may be implemented as an executable computer-application program, a network-accessible computing service, an application-programming interface (API), a library, or a combination of the above and/or other computer resources. FIG. 1 schematically shows non-limiting examples of computers 30 (e.g., depth-imaging controller 30A and training controller 30B) that can enact one or more of the methods and processes described herein.

Each computer 30 includes a logic subsystem 130 and a storage subsystem 132. Either or both computers may optionally include a display subsystem, input subsystem, communication subsystem, and/or other subsystems not shown in the drawings.

Logic subsystem 130 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 132 includes one or more physical devices configured to temporarily and/or permanently hold computer information such as data and instructions executable by the logic subsystem. When the storage subsystem includes two or more devices, the devices may be collocated and/or remotely located. The storage subsystem may include volatile, nonvolatile, dynamic, static, read/write, read-only, random-access, sequential-access, location-addressable, file-addressable, and/or content-addressable devices. The storage subsystem may include removable and/or built-in devices. When logic subsystem 130 executes instructions, the state of storage subsystem 132 may be transformed—e.g., to hold different data.

Aspects of logic subsystem 130 and storage subsystem 132 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

Logic subsystem 130 and the storage subsystem 132 may cooperate to instantiate one or more logic machines or engines. As used herein, the term 'machine' or 'engine' is used to collectively refer to the combination of hardware, firmware, software, instructions, and/or any other components cooperating to provide computer functionality. In other words, 'machines' and 'engines' are never abstract ideas and always have a tangible form. A machine or engine may be instantiated by a single computing device, or may include two or more sub-components instantiated by two or more different computing devices. In some implementations a machine or engine includes a local component (e.g., software application executed by a computer processor) cooperating with a remote component (e.g., cloud computing service provided by a network of server computers). The software and/or other instructions that give a particular machine or engine its functionality may optionally be saved as one or more unexecuted modules on one or more suitable storage devices.

When included, a communication subsystem may be configured to communicatively couple any computer 30 with one or more other computing devices. A communication subsystem may include wired and/or wireless communication devices compatible with one or more different communication protocols. The communication subsystem may be configured for communication via personal-, local- and/or wide-area networks.

This disclosure is presented by way of example and with reference to the drawing figures described above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

One aspect of this disclosure is directed to a method to identify one or more depth-image segments that correspond to a predetermined object type. Enacted in a depth-imaging controller operatively coupled to an optical time-of-flight (ToF) camera, the method comprises: receiving depth-image data from the optical ToF camera, the depth-image data exhibiting an aliasing uncertainty, such that a coordinate (X, Y) of the depth-image data maps to a periodic series of depth values $\{Z_k\}$; and labeling, as corresponding to the object type, one or more coordinates of the depth-image data exhibiting the aliasing uncertainty.

In some implementations, the depth-image data includes a series of raw shutters acquired by the optical ToF camera at an invariant modulation frequency. In some implementations, the optical ToF camera is a phase-based optical ToF camera operated at a modulation frequency f, and adjacent elements of the periodic series of depth values differ by a phase wrapping of $c/(2f)$, where c is the speed of light in air. In some implementations, the object type is a foreground object type, and the labeling includes differentiating coordinates corresponding to the foreground object type from coordinates corresponding to one or more background object types. In some implementations, the object type corresponds to a human hand. In some implementations, the one or more labeled coordinates define one or more depth-image segments, and the depth-image data comprises one of a sequence of depth-video frames, the method further comprising tracking the one or more depth-image segments through the sequence of depth-video frames. In some implementations, the labeling is enacted in a segmentation engine trained by machine learning. In some implementations, the segmentation engine includes a convolutional neural network. In some implementations, the segmentation engine is trained to replicate, onto an aliased depth image of a training subject, a ground-truth segmentation label derived from a corresponding, externally labeled, de-aliased depth image of the training subject at corresponding coordinates, and the aliased depth image and the ground-truth segmentation label are provided as training data to the segmentation engine. In some implementations, the segmentation engine is trained to attach, onto coordinates of a simulated aliased depth image of a training subject, a segmentation label consistent with a ground-truth segmentation label provided for those coordinates, and the simulated aliased depth image and the ground-truth segmentation label are provided as training data to the segmentation engine. In some implementations, the depth-image data is acquired subsequent to a keyframe of a depth-video acquisition, the method further comprising: operating the optical ToF camera at a series of modulation frequencies during the keyframe; receiving depth-image data acquired by the optical ToF camera during the keyframe; processing cooperatively the depth-image data acquired by the optical ToF camera during the keyframe to return a de-aliased depth-image in which the aliasing uncertainty is resolved; labeling, as corresponding to the object type, one or more coordinates of the de-aliased depth-image; and operating the optical ToF camera at an invariant modulation frequency subsequent to the keyframe, wherein labeling the one or more coordinates of the depth-image data acquired subsequent to the keyframe is further based on the labeled coordinates of the de-aliased depth-image. In some implementations, the depth-image data comprises an aliased depth image derived from a series of raw shutters acquired by the optical ToF camera at an invariant modulation frequency. In some implementations, the aliased depth image is one of a sequence of aliased depth images each derived from a corresponding series of raw shutters acquired by the optical ToF camera operating at a modulation frequency, the method further comprising varying the modulation frequency across the series of aliased depth images. In some implementations, the modulation frequency is varied periodically across the sequence of aliased depth images. In some implementations, the method further comprises assessing a confidence of labeling the one or more coordinates of the depth-image data, and the modulation frequency is varied across the sequence of aliased depth images responsive to the assessed confidence. In some implementations, the method further comprises selecting one depth value from the periodic series of depth values to maintain a continuity of the identified one or more depth-image segments. In some implementations, the method further comprises constructing and outputting de-aliased depth-image data corresponding to at least a portion of the aliased depth-image data received, wherein constructing the de-aliased depth image data includes inserting the selected one depth value at a coordinate (X', Y') of the de-aliased depth image data corresponding to the coordinate (X, Y) of the aliased depth image data.

Another aspect of this disclosure is directed to a depth-imaging controller operatively coupled to an optical time-of-flight (ToF) camera, the depth-imaging controller comprising: a shutter-acquisition engine configured to cause the optical ToF camera to acquire a series of raw shutters at an acquisition rate; a segmentation engine configured to output a series of segmented depth images at a segmentation rate, wherein one or more coordinates of each segmented depth image are labeled as corresponding to an object type, and wherein the acquisition rate is less than six times the segmentation rate. In some implementations, the acquisition rate is one third the segmentation rate.

Another aspect of this disclosure is directed to a depth-imaging controller operatively coupled to an optical time-of-flight (ToF) camera, the depth-imaging controller comprising: an illumination-control engine configured to cause a modulated emitter of the optical ToF camera to release modulated illumination of an invariant modulation frequency; a shutter-acquisition engine configured to cause the optical ToF camera to acquire a series of raw shutters while the modulated emitter releases the modulated illumination of the invariant modulation frequency; a segmentation engine configured to output a segmented depth image based on aliased depth data acquired from the series of raw shutters, wherein one or more coordinates of the at least one segmented depth image are labeled as corresponding to the object type.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted in a depth-imaging controller operatively coupled to an optical time-of-flight (ToF) camera, a method to identify one or more depth-image segments that correspond to a predetermined object type, the method comprising:

receiving depth-image data from the optical ToF camera, the depth-image data exhibiting an aliasing uncertainty, such that a coordinate (X, Y) of the depth-image data maps to a periodic series of depth values $\{Z_k\}$; and labeling, as corresponding to the predetermined object type, one or more coordinates of the depth-image data exhibiting the aliasing uncertainty, wherein the labeling is enacted in a segmentation engine previously trained by machine learning using training data exhibiting the aliasing uncertainty.

2. The method of claim 1 wherein the depth-image data includes a series of raw shutters acquired by the optical ToF camera at an invariant modulation frequency.

3. The method of claim 1 wherein the optical ToF camera is a phase-based optical ToF camera operated at a modulation frequency f, and wherein adjacent elements of the periodic series of depth values differ by a phase wrapping of $c/(2f)$, where c is the speed of light in air.

4. The method of claim 1 wherein the object type is a foreground object type, and wherein the labeling includes differentiating coordinates corresponding to the foreground object type from coordinates corresponding to one or more background object types.

5. The method of claim 1 wherein the object type corresponds to a human hand.

6. The method of claim 1 wherein the one or more labeled coordinates define one or more depth-image segments, and wherein the depth-image data comprises one of a sequence of depth-video frames, the method further comprising tracking the one or more depth-image segments through the sequence of depth-video frames.

7. The method of claim 1 wherein the segmentation engine includes a convolutional neural network.

8. The method of claim 1 wherein the segmentation engine is trained to replicate, onto an aliased depth image of a training subject, a ground-truth segmentation label derived from a corresponding, externally labeled, de-aliased depth image of the training subject at corresponding coordinates, and wherein the aliased depth image and the ground-truth segmentation label are provided as training data to the segmentation engine.

9. The method of claim 1 wherein the segmentation engine is trained to attach, onto coordinates of a simulated aliased depth image of a training subject, a segmentation label consistent with a ground-truth segmentation label provided for those coordinates, and wherein the simulated aliased depth image and the ground-truth segmentation label are provided as training data to the segmentation engine.

10. The method of claim 1 wherein the depth-image data comprises an aliased depth image derived from a series of raw shutters acquired by the optical ToF camera at an invariant modulation frequency.

11. A depth-imaging controller operatively coupled to an optical time-of-flight (ToF) camera, the depth-imaging controller comprising:
a shutter-acquisition engine configured to cause the optical ToF camera to acquire a series of raw shutters at an acquisition rate;
a segmentation engine configured to output a series of segmented depth images at a segmentation rate, wherein one or more coordinates of each segmented depth image are labeled as corresponding to an object type,
and wherein the acquisition rate is less than six times the segmentation rate.

12. The depth-imaging controller of claim 11 wherein the series of raw shutters is a second series of raw shutters acquired subsequent to a keyframe of a depth-video acquisition, while the optical ToF is operated at an invariant modulation frequency,
wherein the shutter-acquisition engine is further configured to operate the optical ToF camera at a series of modulation frequencies during the keyframe and to receive a first series of raw shutters acquired by the optical ToF camera during the keyframe,
wherein the segmentation engine is further configured to process cooperatively the first series of raw shutters acquired by the optical ToF camera during the keyframe to return a de-aliased depth-image in which the aliasing uncertainty is resolved and to label, as corresponding to the object type, one or more coordinates of the de-aliased depth-image, and
wherein the one or more coordinates of the second series of raw shutters acquired subsequent to the keyframe are labeled further based on the labeled coordinates of the de-aliased depth-image.

13. The depth-imaging controller of claim 11 wherein the segmentation engine is further configured to select one depth value from a periodic series of depth values to maintain a continuity of one or more depth-image segments of the series of segmented depth images.

14. The depth-imaging controller of claim 13 wherein the segmentation engine is further configured to construct and output de-aliased depth-image data corresponding to the series of segmented depth images.

15. The depth-imaging controller of claim 11 wherein the acquisition rate is one third the segmentation rate.

16. A depth-imaging controller operatively coupled to an optical time-of-flight (ToF) camera, the depth-imaging controller comprising:
an illumination-control engine configured to cause a modulated emitter of the optical ToF camera to release modulated illumination of an invariant modulation frequency;
a shutter-acquisition engine configured to cause the optical ToF camera to acquire a series of raw shutters while the modulated emitter releases the modulated illumination of the invariant modulation frequency; and
a segmentation engine configured to output a segmented depth image based on aliased depth data acquired from the series of raw shutters, wherein one or more coordinates of the at least one segmented depth image are labeled as corresponding to the object type.

17. The depth-imaging controller of claim 16 wherein the aliased depth data is one of a sequence of aliased depth images each derived from a corresponding series of raw shutters acquired by the optical ToF camera and wherein the shutter-acquisition engine is further configured to vary a modulation frequency of the optical ToF camera across the sequence of aliased depth images.

18. The depth-imaging controller of claim 17 wherein the modulation frequency is varied periodically across the sequence of aliased depth images.

19. The depth-imaging controller of claim 17 wherein the segmentation engine is further configured to assess a confidence of labeling the one or more coordinates of the at least one segmented depth image, and wherein the modulation frequency is varied across the sequence of aliased depth images responsive to the assessed confidence.

* * * * *